(12) United States Patent
Chakra et al.

(10) Patent No.: US 9,563,325 B2
(45) Date of Patent: Feb. 7, 2017

(54) SELECTIVE UPDATE OF A PAGE HAVING A PEGGED AREA

(75) Inventors: Al Chakra, Apex, NC (US); John Feller, Cary, NC (US); Trudy L. Hewitt, Cary, NC (US); Francesco C. Schembari, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 633 days.

(21) Appl. No.: 13/492,133

(22) Filed: Jun. 8, 2012

(65) Prior Publication Data

US 2013/0332816 A1 Dec. 12, 2013

(51) Int. Cl.
G06F 17/00 (2006.01)
G06F 3/041 (2006.01)
G06F 3/0481 (2013.01)
G06F 3/0484 (2013.01)
G06F 17/30 (2006.01)
G06F 9/455 (2006.01)

(52) U.S. Cl.
CPC ......... G06F 3/0481 (2013.01); G06F 3/04842 (2013.01); *G06F 3/041* (2013.01); *G06F 9/45533* (2013.01); *G06F 17/00* (2013.01); *G06F 17/30861* (2013.01)

(58) Field of Classification Search
CPC G06F 17/30872; G06F 17/00; G06F 9/45533; G06F 3/041; G06F 17/30861
See application file for complete search history.

(56) References Cited

U.S. PATENT DOCUMENTS

| 6,219,818 | B1 | 4/2001 | Freivald et al. |
| 6,366,933 | B1 | 4/2002 | Ball et al. |
| 6,553,419 | B1 | 4/2003 | Ram |
| 6,763,388 | B1 | 7/2004 | Tsimelzon |
| 6,834,306 | B1 | 12/2004 | Tsimelzon |
| 6,981,225 | B1 | 12/2005 | Gaudette |
| 7,152,203 | B2 * | 12/2006 | Gao et al. ............. 715/240 |
| 7,386,802 | B2 | 6/2008 | Gaudette |
| 7,523,158 | B1 * | 4/2009 | Nickerson et al. ........ 709/203 |
| 7,559,016 | B1 | 7/2009 | Rakowski et al. |
| 7,702,811 | B2 | 4/2010 | Gopalan et al. |
| 7,958,232 | B1 * | 6/2011 | Colton et al. ............ 709/224 |

(Continued)

FOREIGN PATENT DOCUMENTS

WO 2012021780 A2 2/2012

OTHER PUBLICATIONS

Sparkchess, Aug. 26, 2011, http://www.sparkchess.com, 6.0.0 online lite (sparkchess.pdf), pp. 2-6.*

(Continued)

*Primary Examiner* — Scott Baderman
*Assistant Examiner* — Sookil Lee
(74) *Attorney, Agent, or Firm* — Jordan IP Law, LLC

(57) ABSTRACT

Methods and systems of displaying response data provide for initiating a retrieval of response data such as a web page and initiating an update of the web page to a screen having a display area. Additionally, a user selection of a subset of the display area can be detected, wherein the subset of the display area is defined as a pegged area corresponding to a subset of the web page. Moreover, at least the subset of the web page may be prevented from being updated to the screen in response to the user selection while retrieval of the web page continues.

16 Claims, 3 Drawing Sheets

(56) References Cited

U.S. PATENT DOCUMENTS

| | | | |
|---|---|---|---|
| 8,103,742 B1* | 1/2012 | Green | 709/218 |
| 8,176,433 B2 | 5/2012 | Bauchot et al. | |
| 8,181,112 B2* | 5/2012 | Jolley et al. | 715/742 |
| 8,185,621 B2 | 5/2012 | Kasha | |
| 8,606,955 B1* | 12/2013 | Fernandes et al. | 709/231 |
| 8,762,878 B1* | 6/2014 | Weber et al. | 715/777 |
| 2002/0154173 A1 | 10/2002 | Etgen et al. | |
| 2002/0194296 A1 | 12/2002 | Dutta et al. | |
| 2004/0044785 A1 | 3/2004 | Bell et al. | |
| 2006/0259585 A1* | 11/2006 | Keohane et al. | 709/219 |
| 2006/0274083 A1* | 12/2006 | Makela | 345/619 |
| 2007/0214239 A1* | 9/2007 | Mechkov et al. | 709/219 |
| 2007/0288589 A1 | 12/2007 | Chen et al. | |
| 2008/0059544 A1 | 3/2008 | Rahim | |
| 2008/0104520 A1* | 5/2008 | Swenson et al. | 715/738 |
| 2008/0200154 A1 | 8/2008 | Maharajh et al. | |
| 2008/0201452 A1 | 8/2008 | Athas et al. | |
| 2008/0307301 A1 | 12/2008 | Decker et al. | |
| 2009/0070413 A1* | 3/2009 | Priyadarshan et al. | 709/203 |
| 2010/0005053 A1 | 1/2010 | Estes | |
| 2010/0077321 A1 | 3/2010 | Shen et al. | |
| 2010/0146400 A1 | 6/2010 | Tesler et al. | |
| 2010/0287462 A1 | 11/2010 | Hauser | |
| 2010/0313252 A1* | 12/2010 | Trouw | 726/7 |
| 2010/0318892 A1 | 12/2010 | Teevan et al. | |
| 2011/0252160 A1 | 10/2011 | Wu | |
| 2011/0261142 A1 | 10/2011 | Shanmukhadas et al. | |
| 2011/0289392 A1 | 11/2011 | Naqvi | |
| 2012/0220346 A1* | 8/2012 | Yu | G06F 17/30899 455/566 |
| 2012/0278697 A1 | 11/2012 | Yokoyama et al. | |
| 2013/0138477 A1 | 5/2013 | Wilkins et al. | |
| 2013/0283150 A1 | 10/2013 | Chen et al. | |
| 2013/0332816 A1 | 12/2013 | Chakra et al. | |

OTHER PUBLICATIONS

TheDizle, Mar. 29, 2012, http://gametipcenter.com/mass-effect-3-cheats-unlocks-unlockables-endings-guides-more, (Mass Effect 3.pdf), p. 6.*

Plainchess, Jan. 9, 2012, https://github.com/timwoelfle/PlainChess/tree/99b4a5ad78d69691cb16197a1ac024e315cedf08 (Plainchess.pdf), pp. 1-2.*

Al Chakra et al,. "Displaying Quantitative Trending of Pegged Data from Cache", Specification and Drawings for U.S. Appl. No. 13/644,771, filed Oct. 4, 2014, 18 pages.

Non-Final Office Action for U.S. Appl. No. 14/159,703, mailed Nov. 23, 2015, 41 pages, United States Patent & Trademark Office.

Non-Final Office Action for U.S. Appl. No. 13/644,771, mailed May 15, 2014, 25 pages, United States Patent & Trademark Office.

Final Office Action for U.S. Appl. No. 13/644,771, mailed Oct. 2, 2014, 31 pages, United States Patent & Trademark Office.

Advisory Action for U.S. Appl. No. 13/644,771, mailed Jan. 8, 2015, 4 pages, United States Patent & Trademark Office.

Notice of Allowance for U.S. Appl. No. 13/644,771, mailed Jan. 6, 2016, 19 pages, United States Patent & Trademark Office.

Final Office Action for U.S. Appl. No. 14/159,703, mailed on Mar. 15, 2016, 31 pages.

Notice of Allowance for U.S. Appl. No. 14/159,703, mailed on Jun. 9, 2016, 12 pages.

Corrected Notice of Allowability for U.S. Appl. No. 14/159,703, mailed on Jun. 21, 2016, 6 pages.

Notice of Allowance for U.S. Appl. No. 13/644,771, mailed on Mar. 14, 2016, 5 pages.

* cited by examiner

SELECTIVE UPDATE OF A PAGE HAVING A PEGGED AREA

BACKGROUND

Embodiments of the present invention generally relate to the display of user requested data. More particularly, embodiments relate to the user based pegging of display areas while requested data continues to be retrieved.

When a user requests a web page, the display of that web page may not occur all at once. For example, the page may include a login area, targeted advertisements, and other data that might not all be retrieved and displayed at the same rate. In such a case, data may be updated to the display screen on a periodic basis until the page load is complete, based on the sequence and order the developer coded the page. If the user attempts to interact with a portion of the page before the page load is complete, however, a number of difficulties may arise. For example, user identifier and/or password information typed into a login area of a page could be deleted with each screen update, forcing the user to start over.

BRIEF SUMMARY

Embodiments may include a computer program product having a computer readable storage medium and computer usable code stored on the computer readable storage medium. If executed by a processor, the computer usable code may cause a computer to initiate a retrieval of response data associated with a user request, and initiate an update of the response data to a screen having a display area. The computer usable code, if executed, can also cause a computer to detect a user selection of a subset of the display area, wherein the subset of the display area is to correspond to a subset of the response data. Additionally, the computer usable code, if executed may cause a computer to prevent at least the subset of the response data from being updated to the screen in response to the user selection and defined pegged area while retrieval of the response data continues.

Embodiments may also include a computer implemented method in which a user request is received via a web browser interface and a retrieval of a web page is initiated in response to the user request. The method can also provide for initiating an update of the web page to a screen having a display area, and detecting a user selection (pegging) of a subset of the display area, wherein the subset of the display area corresponds to a subset of the web page. In addition, the user selection may correspond to one or more of a cursor hover action and a touch screen action. The method can also involve preventing at least the subset of the web page from being updated to the screen in response to the user selection while retrieval of the web page continues. Additionally, a user interaction may be detected with the respect to the subset of the display area while the subset of the web page is prevented from being updated to the screen, wherein a response may be generated based on the user interaction. The method can also provide for detecting a user de-selection (un-pegging) of the subset of the display area, and resuming the update of the subset of the web page to the screen in response to the user de-selection.

Embodiments may also include a computer program product having a computer readable storage medium and computer usable code stored on the computer readable storage medium. If executed by a processor, the computer usable code may cause a computer to receive a user request via a web browser interface, initiate a retrieval of a web page in response to the user request, and initiate an update of the web page to a screen having a display area. Additionally, the computer usable code, if executed, can cause a computer to detect a user selection of a subset of the display area, wherein the subset of the display area corresponds to a subset of the web page, and wherein the user selection is to correspond to one or more of a cursor hover action and a touch screen action. The computer usable code, if executed, may also cause a computer to prevent at least the subset of the web page from being updated to the screen in response to the user selection while retrieval of the web page continues. In addition, the computer usable code, if executed, can cause a computer to detect a user interaction with respect to the subset of the display area while the subset of the web page is prevented from being updated to the screen, generate a response based on the user interaction, detect a user de-selection of the subset of the display area, and resume the update of the subset of the web page to the screen in response to the user de-selection.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1A:
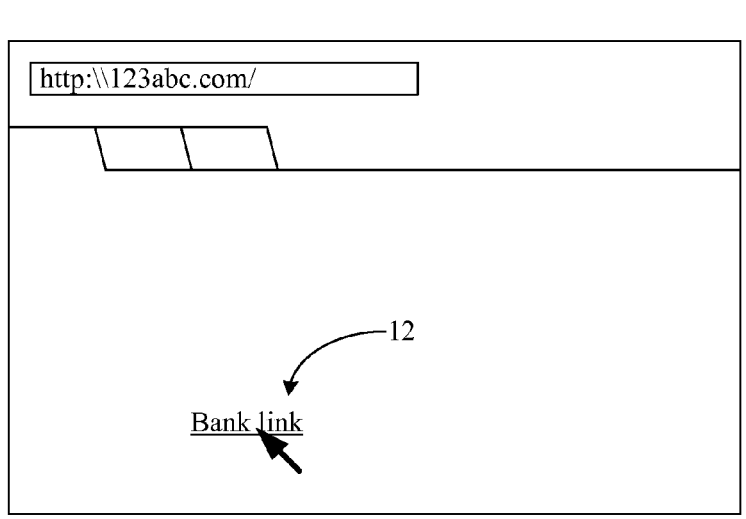
FIGS. 1A-1C are screenshot views of examples of web browser interfaces according to an embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA®, SMALLTALK™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1B:
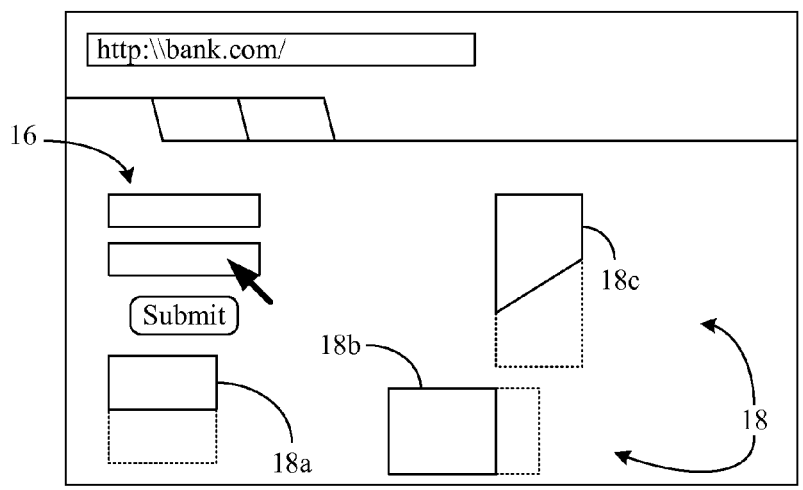
Figure 1C:
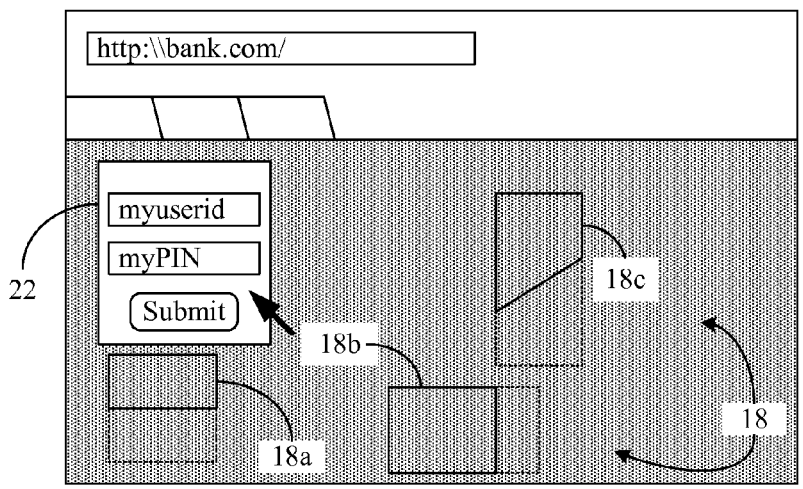

Referring now to FIGS. 1A-1C, a sequence of web browser interfaces is shown in which user based pegging of display areas is conducted while response/requested data continues to be retrieved. In the illustrated example, a web page 10 is displayed to a user via a screen (e.g., touch screen, monitor, LCD/liquid crystal display), wherein the web page 10 may include a link 12 to another web page. The link 12, which may be to a page on the same or different site as the web page 10, might be associated with banking, ecommerce (electronic commerce), social networking, video and/or audio streaming, or any other topic of interest to the user. Upon selecting the link 12, retrieval of an initial page view 14 can begin, wherein the initial page view 14 is updated to the screen as the data on the requested web page becomes available. Thus, the initial page view 14 represents the requested web page data in an initial state. Other configurations, such as desktop search interfaces may also be used, as will be discussed in greater detail.

In the illustrated example, the initial page view 14 contains a login area 16 (e.g., user name and password entry widget) as well as various other areas 18 (18a-18c) containing content such as advertisements, menus, and so forth, wherein retrieval and display of the content in the other areas 18 may take place at different rates due to networking conditions, local processor workload, memory bandwidth, and so forth. The dotted regions of the other areas 18 therefore represent the portions of the web page not yet displayed, in the example shown. Of particular note is that the user may be interested in interacting with the login area 16 (e.g., logging in to the site) before the screen update is complete. Accordingly, the illustrated solution enables the user to conduct a selection such as a "cursor hover" action (e.g., placing the cursor above the area of interest), a touch screen action (e.g., tapping the area of interest), etc., in order to "peg" a subset of the overall display area for viewing and/or interaction purposes.

For example, a pegged page view 20 of the requested web page demonstrates that the user selection might define a single coordinate location, wherein a height and width of a pegged area 22 (e.g., the subset of the display area) are determined based on the single coordinate location (e.g., using metadata). In such a case, content and/or widgets near the single coordinate location may be automatically identified and selected for inclusion in the pegged area 22. Alternatively, the user selection could define a plurality of coordinate locations (e.g., two or more corners), wherein the height and width of the pegged area 22 are determined based on the plurality of coordinate locations. At least the subset of the web page corresponding to the pegged area 22 may be prevented from being updated to the screen in response to the user selection. Retrieval of the web page, however, may continue while the pegged area 22 is pegged. Thus, the user selection (e.g., cursor hover action, touch screen action, etc.) can cause the pegged area 22 to be frozen/pegged without halting or otherwise delaying any portion of the retrieval of the underlying web page. In the illustrated example, the appearance of the display portion outside the pegged area 22 is modified (e.g., grayed out) to enhance the visual distinction between the pegged and non-pegged areas.

As already noted, the user may interact with the pegged area 22 without impacting the web page retrieval process. Accordingly, the user might, for example, type a user name ("myuserid") and password ("myPIN") into the login area fields without concern over the typed information being deleted by screen updates. Indeed, the user could even select the "Submit" button in the example shown, which would initiate retrieval of a login response page instead of the originally requested page. Thus, the illustrated page peg can persist until a different page is requested or the user de-selects the pegged area 22, wherein de-selecting the pegged area 22 may be conducted by, for example, removing the cursor from the pegged area 22.

If the user de-selects the pegged area 22, the update of the subset of the web page corresponding to the pegged area 22 may be synchronized with the real-time state of the web page portion outside the previously pegged subset of the web page (i.e., the grayed area in the example shown). In this regard, the real-time state of the grayed area may be tracked while the pegged area 22 is pegged, wherein the real-time state can reflect the response data that has been retrieved up to the moment of the de-selection of the pegged area 22. The synchronization may therefore involve skipping the pegged area 22 ahead to the state in which it would have existed if the area 22 had never been pegged.

Figure 2:
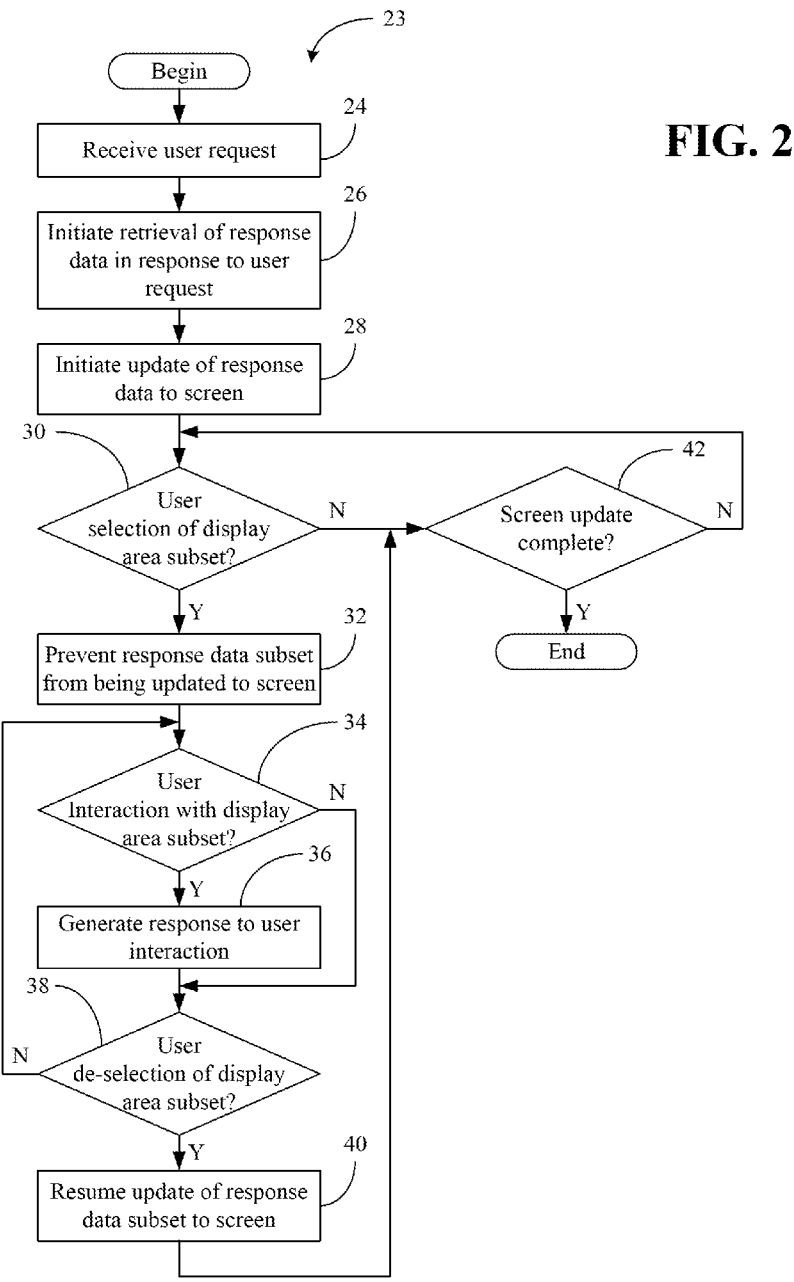
FIG. 2 is a flowchart of an example of a method of displaying response data according to an embodiment.

Turning now to FIG. 2, a method 23 of displaying response data is shown. The method 23 may be implemented in an application such as, for example, a web browser or desktop operating system (OS), wherein the application can be executed on a desktop computer, notebook computer, handheld device, and so forth. Illustrated processing block 24 provides for receiving a user request, wherein block 26 may initiate a retrieval of response data in response to the user request. If the user request is received via a web browser interface, the response data may correspond to a web page. If, on the other hand, the user request is received via a desktop interface, the response data might correspond to search results. Block 26 may also provide for tracking the real-time state of response data retrieved in response to the user request.

An update of the response data to a screen having a display area may be initiated at block 28, wherein a determination can be made at block 30 as to whether a user selection of a subset of the display area (e.g., pegged area) has been made. If so, illustrated block 32 prevents at least the subset of the response data corresponding to the pegged area from being updated to the screen. Of particular note is that the prevention of the screen update occurs while the retrieval of response data continues, in the example shown. A determination may also be made at block 34 as to whether a user interaction with the pegged area has been detected. If so, a response may be generated at block 36 based on the user interaction. Additionally, illustrated block 38 determines whether the user has de-selected the pegged area (e.g., by moving the cursor outside the pegged area or tapping outside the pegged area). If no de-selection has occurred, the pegged area may continue to be monitored for user interactions. If, on the other hand, a de-selection has occurred, block 40 may resume the update of the subset of the response data corresponding to the pegged area to the screen. Illustrated block 42 determines whether the screen update is complete (e.g., entire web page has been displayed, entire search results have been displayed, etc.). If not, the display area can continue to be monitored for pegged area selections. Otherwise, the illustrated process may end.

Figure 3:
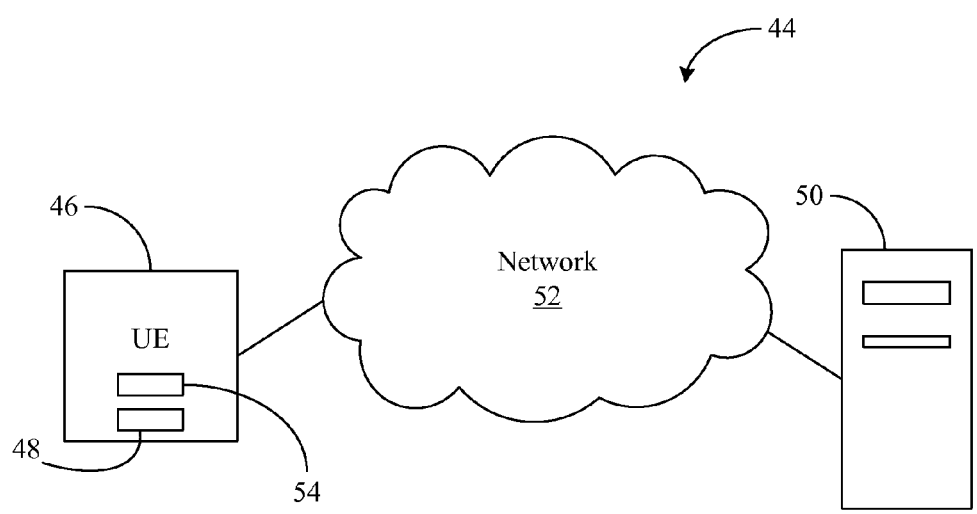
FIG. 3 is a block diagram of a networking architecture according to an embodiment.

FIG. 3 shows a networking architecture 44 in which a user equipment (UE) device 46 includes a browser 48 that is configured to initiate a retrieval of one or more web pages from a server 50 via a network 52 in response to a user request. In the illustrated example, the server 50 can have stored thereon hypertext markup language (HTML) and other markup language-encoded content, as well as databases and applications such as JAVA® and other applications. The network 52 can itself include any suitable combination of servers, access points, routers, base stations, mobile switching centers, public switching telephone network (PSTN) components, etc., to facilitate communication between the UE device 46 and the server 50.

In one example, the browser 48 also initiates an update of a particular web page to a screen having a display area and detects a user selection of a subset of the display area, wherein the subset of the display area corresponds to a subset of the web page. Moreover, the browser 48 may be configured to prevent at least the subset of the web page from being updated to the screen in response to the user selection while retrieval of the web page continues.

The illustrated UE device 46 also includes a desktop interface 54 that may be used to search the UE device 46 for files and other content. In one example, the desktop interface 54 initiates a retrieval of search results associated with a user request, initiates an update of the search results to a screen having a display area, and detects a user selection of a subset of the display area (e.g., pegged area), wherein the subset of the display area corresponds to a subset of the search results. The desktop interface 54 may also be configured to prevent at least the subset of the search results from being updated to the screen in response to the user selection while retrieval of the search results continues.

Thus, techniques described herein may provide users with increased usability with respect to computer interactions, as well as the ability to more accurately make selections during data loading or querying processes. In addition, productivity may be increased by eliminating any need for the user to wait for pages to be loaded or queries to be completed (e.g., if the desired result is already being displayed). Moreover, increased accuracy can be achieved by preventing accidental selections of content while new results continue to be updated to the screen.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:
1. A computer implemented method comprising:
receiving a user request via a web browser interface;
initiating a retrieval of a web page in response to the user request;
initiating an update of the web page to a screen having a display area;
detecting a user selection of a user-defined subset of the display area, wherein the user-defined subset of the display area corresponds to a subset of the web page and the update of the web page includes an update of the subset of the web page, and wherein the user selection corresponds to a touch screen action;
preventing at least the subset of the web page from being updated to the screen in response to the user selection while retrieval of the web page continues;
tracking a real-time state of a web page portion outside the subset of the web page;
detecting a user interaction with respect to the user-defined subset of the display area to enter information requested by the user-defined subset of the display area while the subset of the web page is prevented from being updated to the screen, wherein the information requested includes a user identifier and a password;
generating a response based on the user interaction;
detecting a user de-selection of the user-defined subset of the display area;
resuming the update of the subset of the web page to the screen in response to the user de-selection; and
synchronizing the update of the subset of the web page with the real-time state.

2. The method of claim 1, further including modifying a display appearance of a display portion outside the user-defined subset of the display area while the subset of the web page is prevented from being updated to the screen.

3. The method of claim 1, wherein the user selection defines a single coordinate location and the method further includes determining a height and width of the user-defined subset of the display area based on the single coordinate location.

4. The method of claim 1, wherein the user selection defines a plurality of coordinate locations and the method further includes determining a height and width of the user-defined subset of the display area based on the plurality of coordinate locations.

5. A computer program product comprising:
a computer readable storage medium; and
computer usable code stored on the computer readable storage medium, where, if executed by a processor, the computer usable code causes a computer to:
receive a user request via a web browser interface;
initiate a retrieval of a web page in response to the user request;
initiate an update of the web page to a screen having a display area;
detect a user selection of a user-defined subset of the display area, wherein the user-defined subset of the display area corresponds to a subset of the web page and the update of the web page includes an update of the subset of the web page, and wherein the user selection is to correspond to a touch screen action;
prevent at least the subset of the web page from being updated to the screen in response to the user selection while retrieval of the web page continues;
track a real-time state of a web page portion outside the subset of the web page;
detect a user interaction with respect to the user-defined subset of the display area to enter information requested by the user-defined subset of the display area while the subset of the web page is prevented from being updated to the screen, wherein the information requested includes a user identifier and a password;
generate a response based on the user interaction;
detect a user de-selection of the user-defined subset of the display area;
resume the update of the subset of the web page to the screen in response to the user de-selection; and
synchronize the update of the subset of the web page with the real-time state.

6. The computer program product of claim 5, wherein the computer usable code, if executed, causes a computer to modify a display appearance of a display portion outside the user-defined subset of the display area while the subset of the web page is prevented from being updated to the screen.

7. The computer program product of claim 5, wherein the user selection is to define a single coordinate location and the computer usable code, if executed, causes a computer to determine a height and width of the user-defined subset of the display area based on the single coordinate location.

8. The computer program product of claim 5, wherein the user selection is to define a plurality of coordinate locations and the computer usable code, if executed, causes a computer to determine a height and width of the user-defined subset of the display area based on the plurality of coordinate locations.

9. A computer program product comprising:
a computer readable storage medium; and
computer usable code stored on the computer readable storage medium, where, if executed by a processor, the computer usable code causes a computer to:
initiate a retrieval of response data associated with a user request;
initiate an update of the response data to a screen having a display area;
detect a user selection of a user-defined subset of the display area, wherein the user-defined subset of the display area is to correspond to a subset of the response data and the update of the response data includes an update of the subset of the response data, and wherein the user selection corresponds to a touch screen action;
detect a user interaction with respect to the user-defined subset of the display area while the subset of the response data is prevented from being updated to the screen;
detect a request for user input from the user-defined subset of the display area, wherein the user input requested includes a user identifier and a password;
prevent at least the subset of the response data from being updated to the screen in response to the user selection while retrieval of the response data continues so that the user may further interact with the user-defined subset of the display area;
track a real-time state of response data outside the subset of the response data;
detect a user de-selection of the user-defined subset of the display area;
resume the update of the subset of the response data to the screen in response to the user de-selection; and
synchronize the update of the subset of the response data with the real-time state.

10. The computer program product of claim 9, wherein the computer usable code, if executed, causes a computer to generate a response based on the user interaction.

11. The computer program product of claim 9, wherein the computer usable code, if executed, causes a computer to modify a display appearance of a display portion outside the user-defined subset of the display area while the subset of the response data is prevented from being updated to the screen.

12. The computer program product of claim 9, wherein the computer usable code, if executed, causes a computer to receive the user request and the user selection via a web browser interface, wherein the response data is to correspond to a web page.

13. The computer program product of claim 9, wherein the computer usable code, if executed, causes a computer to receive the user request and the user selection via a desktop interface, wherein the response data is to correspond to search results.

14. The computer program product of claim 9, wherein the user selection is to correspond to a cursor hover action.

15. The computer program product of claim 9, wherein the user selection is to define a single coordinate location and the computer usable code, if executed, causes a computer to determine a height and width of the user-defined subset of the display area based on the single coordinate location.

16. The computer program product of claim 9, wherein the user selection is to define a plurality of coordinate locations and the computer usable code, if executed, causes a computer to determine a height and width of the user-defined subset of the display area based on the plurality of coordinate locations.

* * * * *